March 28, 1961

A. L. IMSHAUG 2,976,615

APPARATUS FOR CHECKING DIMENSIONAL
CHARACTERISTICS OF PRINTING PLATES

Filed May 15, 1957

Inventor
Arnold L. Imshaug
By his Attorneys
Chapin & Neal

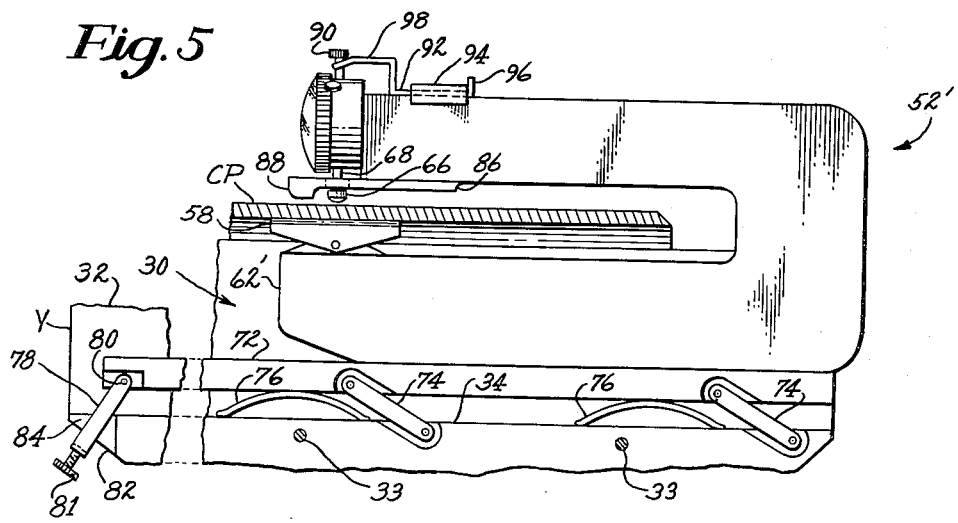
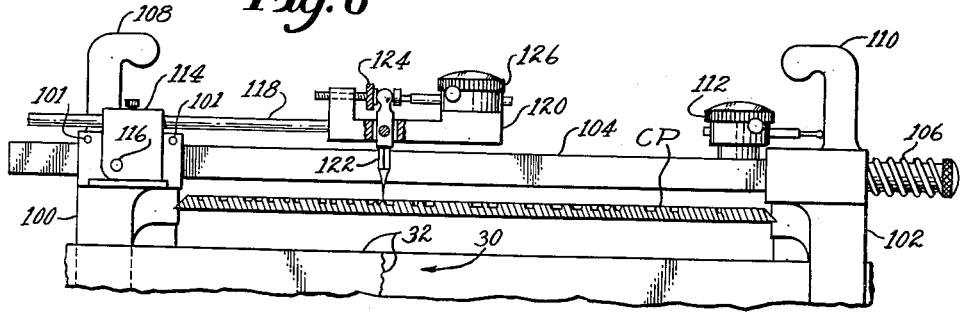
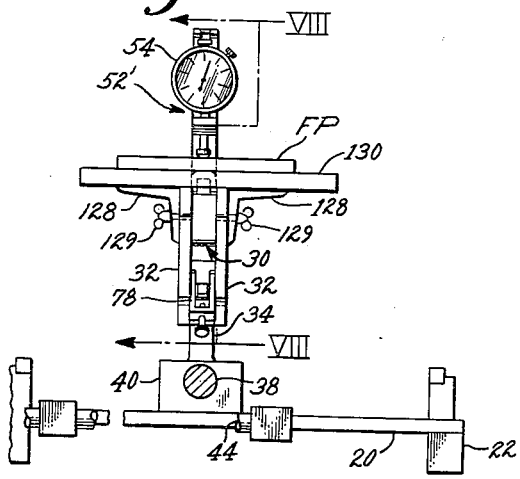
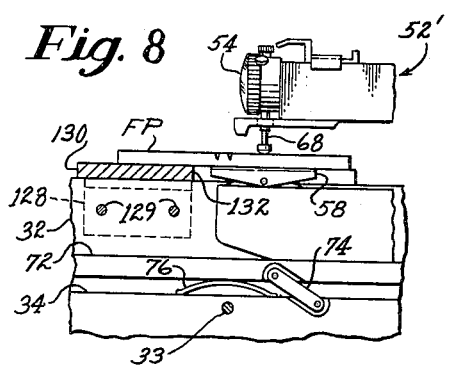
Inventor
Arnold L. Imshaug
By his Attorneys
Chapin & Neal United States Patent Office 2,976,615
Patented Mar. 28, 1961

2,976,615
APPARATUS FOR CHECKING DIMENSIONAL CHARACTERISTICS OF PRINTING PLATES
Arnold L. Imshaug, Brookwood, Montague, Mass.
Filed May 15, 1957, Ser. No. 659,343
16 Claims. (Cl. 33—147)

The present invention relates to the art of printing and more particularly to improved means for checking the dimensional accuracy of printing plates.

While the dimensional accuracy of printing plates may be checked on a trial and error basis it is, of course, much more efficient to check their dimensions by making direct measurements before installing them in a press. Thus inaccurate plates may be corrected or remade at the earliest possible moment, minimizing delay in providing acceptable plates as well as providing other substantial economies in time and materials.

While the desirability for making such comparative measurements is well recognized, the number and variety of measurements required has been a deterrent to checking each and every plate in all details. This means that reliance in some cases is placed on spot checking or checking on only one or a few of the dimensions involved. In other words, in many cases it may be economically impractical to make the desired number of comparative measurements because of the amount of time required to do so.

This situation is further aggravated by the lack, in many cases, of means for measuring the degree of inaccuracy so that the amount of correction required may be readily ascertained. Such measurements of error are extremely useful as in determining what corrective steps should or can be taken. This applies, for example, to the concentricity of curved plates, the height of raised printing portions, that is, the depth of relief provided, the registration of printing plates for color work and so forth.

The primary object of my invention is to improve the speed and convenience with which the dimensional accuracy of printing plates may be checked.

Another object is to provide improved means for ascertaining the degree of inaccuracy of printing plate dimensions.

Still another object of my invention is to provide improved means for checking such dimensions which are particularly adapted for use with curved printing plates.

The above and other related objects as well as the various novel features of construction will be apparent from a reading of the following description of the disclosure found in the accompanying drawings and the novelty thereof pointed out in the appended claims.

In the drawings,

Fig. 5 is a section taken on the line V—V in Fig. 2 but showing an alternate construction;

Fig. 6 is a section taken generally on the line V—V in Fig. 2 but showing the use of another type of measuring means;

Fig. 7 is a front elevation, with certain parts broken away and on a reduced scale, of a modified form of my apparatus; and Fig. 8 is a section taken on the line VIII—VIII in Fig. 7.

Figure 1:
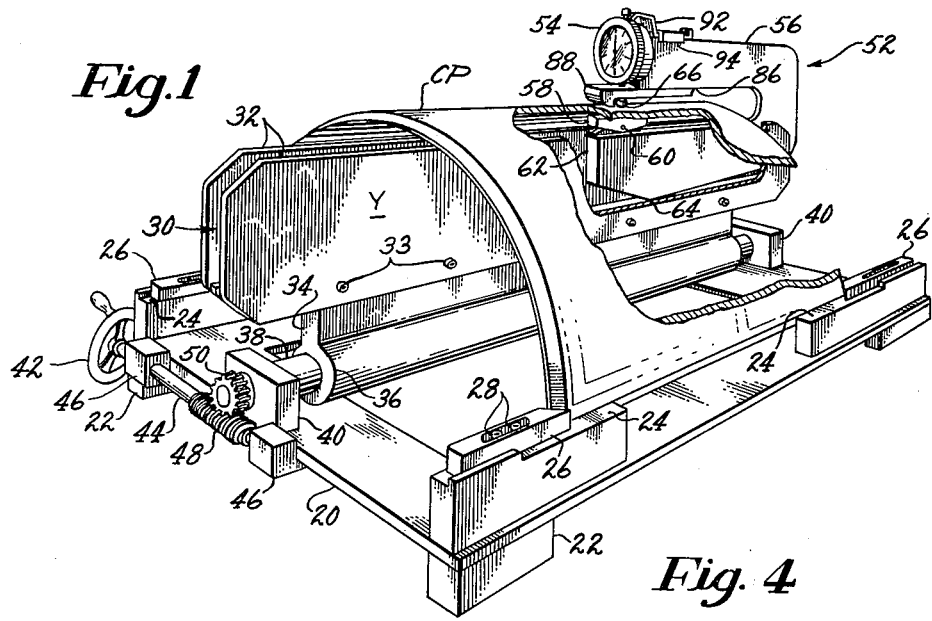
Fig. 1 is a perspective view, with certain portions broken away, of an apparatus embodying my invention.

The improved apparatus of the present invention comprises a base 20 which may be rectangular in outline as seen in Fig. 1 and have legs 22 for supporting it on a table, bench or the like. The base 20 may be provided with raised seats 24 for receiving and positioning, in a height-wise sense, a curved printing plate CP. The plate CP may be laterally and longitudinally positioned with respect to the base 20 by lugs 26 which are beveled to match the conventionally bevelled side edges of the plate CP. The lugs 26 are secured to the seats 24 by screws extending through elongated slots indicated generally at 28 enabling the lugs to be adjusted longitudinally of the seats 24 so that the curved plate CP may be clamped in predetermined relation to the base 20.

Figure 2:
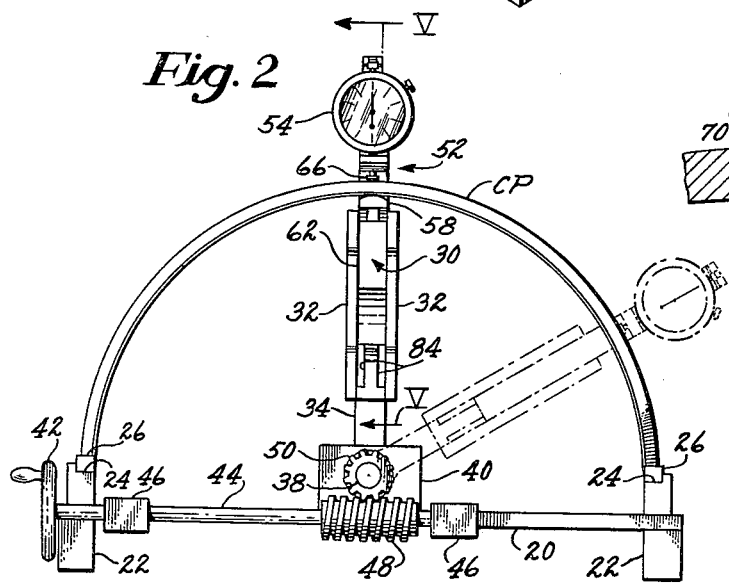
Fig. 2 is a front elevation of the apparatus seen in Fig. 1.

Way and guide means are carried on the base 20 to position measuring means with respect to the supported plate. Thus a longitudinal guideway 30 may be formed by spaced plates 32 secured by screws 33 to either side of an elongated arm 34. The arm 34 is provided with a centrally disposed hub 36 at its lower end for receiving a shaft 38 to which the hub is made fast and which is journaled in blocks 40 on the frame 20. It will be noted that the guideway 30 is radially disposed of the shaft 38 and that the axis of the latter is coincident with the axis of a properly positioned plate as the plate CP in Fig. 2.

The shaft 38 may be rotated, for reasons which further appear, by a hand wheel 42 (Figs. 1 and 2) which rotates a transverse shaft 44 journaled in blocks 46 extending from the base 20. A worm 48 is secured to the shaft 44 and meshes with a worm gear 50 secured to the outer end of shaft 38. The worm 48 and worm gear 50 are non-reversing, that is their pitch and the frictional forces involved prevent the worm 48 from being rotated by the gear 50. Thus the guideway 30 will remain or be locked in any angular position to which it is adjusted, as indicated in phantom in Fig. 2.

A C-shaped bar 52 (Figs. 1 and 2) carries measuring means which may comprise a dial gauge or dial indicator 54, of conventional and well known construction, mounted on the outer end of the upper C-bar arm 56 and an anvil 58 having a rounded upper surface and pivotally mounted at 60 on the lower C-bar arm 62. The lower arm 62 is of thickness approximating the width of the guideway 30 and serves as a cooperative guide for positioning the described measuring means. Further the bottom of the lower arm 62 may be beveled (Fig. 1) in a forward and rearward manner to provide a fulcrum or pivot point as at 64 which rests on the bottom of guideway 30 (or top of arm 34). The fulcrum point is so disposed that the weight of the inner end of the C-bar 52 swings the anvil 58 into firm engagement with the underside of the plate CP.

Figure 3:
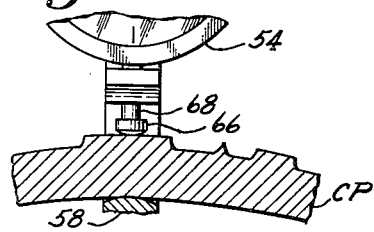
Fig. 3 is an enlarged view of the measuring means seen in Fig. 1 with the workpiece shown in section.

One of the measurements that may be made with the above described measuring means is the thickness of the plate CP. With the anvil 58 bearing against the undersurface of said plate (Fig. 3), a contact button 66 at the lower end of the indicator plunger 68 will engage the upper surface of the plate CP. Thus the thickness of the plate at a given point may be read directly from the dial indicator 54. Several thickness measurements may rapidly be made by shifting the C-bar 52 along the guideway 30 and by rotating the guideway about the axis of shaft 38 by turning the handwheel 42. The facility with which measurements may be made is due to the fact that the measuring means are always in a position to make a measurement regardless of what point on the plate they are shifted to.

Figure 4:
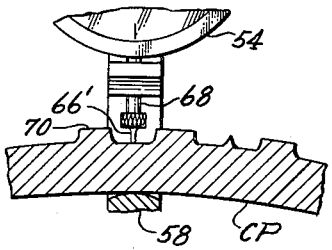
Fig. 4 is a view similar to Fig. 3 showing a different form of measuring means.

It is also possible to make measurements of the depth to which the printing surface is relieved by attaching a contact button 66', having a small cross section, to the plunger 68 (Fig. 4). Such depth of relief measurements may be made by first bringing the contact button 66' into engagement with a raised printing portion (as at 70); zeroing the dial indicator 54; and then shifting the C-bar 52 to bring the tip of the contact button into engagement with a relieved portion as seen in Fig. 4. When so shifted, the depth of relief may be read directly from the dial indicator 54. Again measurements may be made over the whole area of the plate CP by shifting the C-bar 52 in the manner above described.

An alternate manner of mounting the C-bar 52 is illustrated in Fig. 5. The C-bar 52' seen in Fig. 5 is identical in all respects to the C-bar 52 except for the configuration of the lower edge of the lower arm 62' (like reference characters being used to designate unmodified portions found in C-bar 52). A fulcrum point as at 64 (Fig. 1) is not provided since other means, now to be described, are employed to urge the anvil 58 into engagement with the undersurface of the plate CP. These means include a rail 72 (Fig. 5), longitudinally disposed within the guideway 30, and mounted for parallel movement towards and away from the bottom of the guideway by links 74. Leaf springs 76 at all times urge the rail away from the bottom of the guideway toward an upper position as limited by a U-shaped strap 78. Said U-shaped strap is pivotally connected to rail 72 at 80 and has a screw 81 threaded through its bridge for engagement with an undercut surface 82 on the arm 34. The arm 34 is also recessed at 84 (see also Fig. 2) to provide clearance for the U-strap 78.

It will be noted that arm 62' (Fig. 5) is also beveled at its outer end but in this form the reason for the bevel is primarily to facilitate insertion of the arm 62' beneath the plate CP. Naturally when this is done the rail 72 is depressed and springs 76 urge the anvil 58 into firm engagement with the undersurface of the plate CP. The same measuring means, that is the dial indicator 54, is carried by the C-bar 52' and may be used in the manner previously described.

The C-bars 52 and 52' (Figs. 1 and 5) are both provided with means (identified by like reference characters) for protecting the plunger 68 of the dial indicator 54 from injury or abuse when the C-bar is being inserted in the guideway 30. These means include a relatively rugged guard plate 86, apertured to provide clearance for the plunger 68 and secured to the upper arm of the C-bar. The guard plate 86 has, at its outer end, a projection 88 which depends a distance approximating the thickness of the contact button 66. The stem 68 extends through and above the dial indicator and is provided with a head 90 at its upper end. A bar 92 is slidably mounted on the upper arm of C-bar at 94. One end of the bar 92 is turned upwardly at 96 (see Fig. 5 particularly) to facilitate its manipulation, while the other end of said bar is offset at 98 and extends towards the head 90. The outermost end of the offset portion 98 is downwardly beveled and bifurcated to receive the plunger 68. The bar 92, when slid to the position illustrated in Fig. 5, will lift and maintain the plunger 68 in a raised position wherein it will be protected by the dependent projection 88.

The use of other measuring means in my improved apparatus is illustrated in Fig. 6. The guideway forming plates 32 remain unchanged, and receive and position an alternate form of guide. Carried on the guide are means for checking the width of the plate CP (similar to that described and claimed in my Patent No. 2,685,136) and means for checking the registration of printing portions used in color printing (as described and claimed in my copending application Serial No. 408,804, filed February 8, 1954, now Patent No. 2,810,204 issued October 22, 1957).

The guide means of Fig. 6 take the form of rectangular bars 100, 102 which are accurately positioned in the guideway 30 between plates 32. The bars 100, 102 are interconnected by a longitudinally extending rod 104, with the bar 100 being adjustable and securely clamped thereon as by clamping screws at 101. The bar 102 is slidable on the rod 104 with a spring 106 urging it inwardly thereof. Hand grips 108, 110 extend from the upper ends of bars 100, 102 respectively, and a dial indicator 112 is mounted on the rod 104 with its plunger engaging the hand grip 110. It will be apparent that when the notched portions of the bars 100, 102 receive the edges of the plate CP, the reading of the dial indicator 112 will reflect the width of the plate CP, the advantages of which will be more fully appreciated from a reading of my above designated Patent No. 2,685,136.

Mounted on the upper end of bar 100 are the color registration checking means similar to those shown in my application Serial No. 408,804. Briefly, they comprise a block 114 pivotally mounted on the bar 100 at 116. A rod 118, clamped in the block 114, overlies the plate CP and carries at its outer end a bracket 120. A pointer 122 is pivotally mounted within a slot formed in the bracket 120. The lower end of the pointer 122 is adapted to be positioned with respect to a check point on the plate CP, by comparator gauge means which include a screw 124 threaded into one end of the bracket 120 and bearing against the upper end of the pointer 122. A dial indicator 126 is also mounted on the bracket 120 at its other end and with its plunger also bearing against the upper end of pointer 122. The dial indicator is zeroed in the conventional manner and the screw 124 manipulated to match the lower end of the pointer 122 against a check point on the plate CP. It should also be noted that spring means (not shown) tend to rotate the block 114 in a counterclockwise direction and raise the pointer 122 away from the plate CP.

My apparatus may readily be adapted to checking the dimensional characteristics of flat printing plates in the manner shown in Figs. 7 and 8. Various elements previously described are seen in Fig. 7 with the shaft adjusted so that the guideway 30 is vertically disposed. Angle irons 128 are secured to the outer sides of the plates 32 by screws 129 and carry a horizontal supporting table 130. A flat printing plate FP supported thereon may be measured and checked in much the same fashion as the curved plates. For this purpose C-bar 52' (as shown in Fig. 5) may be employed, with access to the undersurface of FP being provided by a slot 132 in the supporting table 130. Thickness or depth of relief measurements may be made by shifting the plate FP to bring any desired point above the anvil 58. Furthermore, it will be apparent a check may be made of a series of flat color plates for color registration after the manner described in connection with Fig. 6 by providing a table plate 130 permitting the insertion of bars 100 and 102 in opposite ends of the guideway 30.

It will be apparent from the above that apparatus embodying my invention may take many different forms all with the result of greatly facilitating and simplifying the checking of the dimensional characteristics of printing plates. This is particularly true because of the guide and guideway means which enable measurements to be readily checked at any point on the plate.

Having thus described my invention, what I claim as novel and desire to secure by Letters Patent of the United States is:

1. Apparatus for checking dimensional characteristics of printing plates, said apparatus comprising a base, means for positioning a curved printing plate in predetermined relation on said base, measuring means for checking the accuracy of the curved plate, a support for said measuring means, and way and guide means removably receiving said measuring means for positioning the latter on its support, said measuring means being mounted for free sliding movement on the support, and said measuring means support being rotatably mounted about an axis coincident with the axis of the curved plate.

2. In apparatus for checking dimensional characteristics of printing plates, a base member, means for positioning a curved printing plate in predetermined relation on the base member, a rotatable shaft disposed coaxially of the printing plate, a measuring means support secured to said shaft and having a guideway extending throughout its length and radially of said shaft.

3. Apparatus for checking dimensional characteristics of printing plates, said apparatus comprising a base, means for positioning a curved printing plate in predetermined relation on said base, measuring means for checking the accuracy of the curved plate, a support for said measuring means, said measuring means support being rotatable about an axis coincident with the axis of the curved plate, and guide means extending generally radially of said axis for removably and slidably positioning said measuring means on its support.

4. Apparatus for checking the dimensional characteristics of printing plates, said apparatus comprising a base, means for positioning a curved printing plate in predetermined relation on said base, means for measuring the thickness of the curved plate, said measuring means including a C-bar, the lower portion of which serves as a guide and has an anvil at its outer end for engaging the undersurface of the curved plate, said C-bar having a dial indicator at the outer end of its upper arm, the plunger of which is disposed to move toward and away from said anvil to engage the upper surface of the curved plate opposite said anvil, a rotatable shaft disposed coaxially of the curved plate and a support for said C-bar secured to said shaft, said support having a guideway extending radially of the shaft for slidably receiving the lower end of the C-bar.

5. Apparatus as in claim 4 wherein a worm gear is secured to said shaft and a worm is secured to a transverse shaft, whereby the C-bar support may be positioned by rotation of the transverse shaft.

6. Apparatus as in claim 4 wherein a fulcrum point is provided in the lower edge of the lower C-bar arm and spaced from the anvil a distance sufficient for the weight of the inner end of the C-bar to bring the anvil into firm engagement with the undersurface of the curved printing plate.

7. Apparatus as in claim 4 wherein spring means are provided in the bottom of the radial guideway to urge the C-bar anvil into firm engagement with the undersurface of the curved plate.

8. Apparatus as in claim 7 wherein the spring means include a bar extending substantially throughout the length of the guideway and a plurality of links interconnecting the bar and the support to maintain the upper surface of the bar at all times parallel to the axis of the support shaft.

9. Apparatus as in claim 4 wherein the plunger at the end of the indicator is of relatively small cross section whereby the plunger may extend between raised printing portions on the plate to measure the depth of their relief.

10. Apparatus as in claim 4 wherein a protective guard extends from the upper arm of the C-bar and means are provided for drawing and maintaining the dial indicator plunger above the surface of said guard to protect it from injury.

11. Apparatus for checking dimensional characteristics of printing plates, said apparatus comprising a base and means for supporting a printing plate in an elevated position spaced above said base, measuring means for checking the accuracy of the supported plate, a support located below said elevated position of a printing plate mounted on said supporting means and on which said measuring means is removably positioned, said measuring means extending upwardly above the surface of a plate so mounted, and way and guide means of said support disposed in a direction enabling said measuring means to be moved rectilinearly over the surface of said printing plate.

12. In an apparatus for checking dimensional characteristics of printing plates comprising a base and a measuring means support, a plate supporting means positioning a plate in spaced elevated relation to said base, said measuring means support being located above said base and below a plate resting on said supporting means, measuring means removably carried by said support and extending above the surface of a plate positioned on said plate supporting means, and way and guide means on the support slidably receiving the measuring means, said way and guide means being disposed in a direction enabling said measuring means to be moved rectilinearly over the surface of said plate.

13. Apparatus for checking dimensional characteristics of printing plates, said apparatus comprising a base and means for supporting a printing plate in an elevated position spaced above said base, measuring means for checking the accuracy of the supported plate, a support located below said elevated position of a printing plate mounted on said supporting means and on which said measuring means is removably positioned, said measuring means extending upwardly above the surface of a plate so mounted, and way and guide means on said support disposed in a direction generally parallel to surface portions of the plate to be measured, said measuring means being freely slidable in said way and guide means for passing rectilinearly over said surface portions of a plate.

14. The apparatus as set forth in claim 13 in which said means for supporting the printing plate comprises a flat table member detachably secured to said measuring means support.

15. The apparatus as set forth in claim 13 in which the support for removably positioning said measuring means is an upright member in which said way and guide means are formed throughout the entire length thereof and said means for supporting the plate comprises a flat table member detachably secured to the outer surface of said upright member.

16. In apparatus for checking dimensional characteristics of printing plates, a C-bar having spaced arm members, an anvil mounted at the outer and upper end of the lower arm of said C-bar, a dial indicator fixed to the outer end of the upper arm of the C-bar with its plunger in opposed spaced relation relative to said anvil, said lower arm of the bar having an underedge extending in a direction normal to the axis of said indicator plunger for resting on a flat guiding surface, said anvil having a rounded upper surface extending in a direction longitudinally of said lower arm and being pivoted centrally thereof for rocking movement into snug engagement against the undersurface of a printing plate embraced by said arms.

References Cited in the file of this patent

UNITED STATES PATENTS

| 1,539,896 | Claybourne | June 2, 1925 |
| 2,051,357 | Zenke | Aug. 18, 1936 |
| 2,685,136 | Imshaug | Aug. 3, 1954 |
| 2,763,934 | Creek et al. | Sept. 25, 1956 |
| 2,771,682 | Dorr | Nov. 27, 1956 |
| 2,810,204 | Imshaug | Oct. 22, 1957 |

FOREIGN PATENTS

| 914,569 | France | June 24, 1946 |
| 260,891 | Switzerland | Aug. 1, 1949 |
| 268,200 | Switzerland | Aug. 1, 1950 |